(12) United States Patent
Brooks

(10) Patent No.: US 9,550,527 B2
(45) Date of Patent: Jan. 24, 2017

(54) FOUR-WHEEL STEERING ADJUSTABLE TO SENSITIVITY OF OPERATOR CONTROLS

(71) Applicant: CNH Industrial America, LLC., New Holland, PA (US)

(72) Inventor: Nathan Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 69 days.

(21) Appl. No.: 14/699,002

(22) Filed: Apr. 29, 2015

(65) Prior Publication Data

US 2016/0318550 A1 Nov. 3, 2016

(51) Int. Cl.
*B62D 15/02* (2006.01)
*A01B 69/00* (2006.01)
*A01C 23/00* (2006.01)

(52) U.S. Cl.
CPC ............ *B62D 15/025* (2013.01); *A01B 69/00* (2013.01); *A01C 23/00* (2013.01); *B62D 15/021* (2013.01)

(58) Field of Classification Search
CPC ..... B62D 15/025; B62D 15/051; A01B 69/00; A01C 23/00
USPC .......................................................... 701/41
See application file for complete search history.

(56) References Cited

U.S. PATENT DOCUMENTS

| | | | |
|---|---|---|---|
| 4,609,064 A * | 9/1986 | Suzuki | B60K 23/08 180/233 |
| 5,111,901 A | 5/1992 | Bachhuber et al. | |
| 5,417,299 A | 5/1995 | Pillar et al. | |
| 5,607,028 A | 3/1997 | Braun et al. | |
| 5,996,722 A | 12/1999 | Price | |
| 6,488,113 B1 | 12/2002 | Worpell et al. | |
| 6,580,988 B2 | 6/2003 | Lin et al. | |
| 6,882,917 B2 | 4/2005 | Pillar et al. | |
| 7,073,620 B2 | 7/2006 | Braun et al. | |
| 7,258,194 B2 | 8/2007 | Braun et al. | |

(Continued)

FOREIGN PATENT DOCUMENTS

| | | |
|---|---|---|
| CN | 103832472 A | 6/2014 |
| JP | 2193775 A | 7/1990 |

OTHER PUBLICATIONS

Miller et al.; "Control and evaluation methods for multi-mode steering." web-site: http://lib.dr.iastate.edu/cgi/viewcontent.cgi?article=1022&context=abe_eng_conf; pp. 1-11; (2002); US.

(Continued)

*Primary Examiner* — Anne M Antonucci
(74) *Attorney, Agent, or Firm* — Rebecca L. Henkel; Rickard K. DeMille

(57) ABSTRACT

A "dead-band" range may be provided for automatically selecting between two-wheel and four-wheel steering for an agricultural machine. When the machine is being steered minimally within a first band (within the dead-band range), such as in a straightaway path, two-wheel steering may be automatically selected. However, when the machine is being increasingly steered thereby reaching a second band (beyond the dead-band range), four-wheel steering may be automatically selected. An operator may monitor the state of the machine steering via a touchscreen Human Machine Interface (HMI) in the cabin. The operator may also adjust the dead-band range by increasing or decreasing sensitivity via the HMI.

20 Claims, 7 Drawing Sheets

(56) References Cited

U.S. PATENT DOCUMENTS

| | | | |
|---|---|---|---|
| 2004/0129491 A1* | 7/2004 | Bean | B60B 35/003 180/411 |
| 2014/0129106 A1* | 5/2014 | Matsuzaki | B60W 10/06 701/69 |

OTHER PUBLICATIONS

Hongming LV et al.; Closed-Loop Handling Stability of 4WS Vehicle with Yaw Rate Control; Journal of Mechanical Engineering 59(2013)10, pp. 595-603; web-site: http://www.sv-jme.eu/data/upload/2013/10/03_2013_1097_Lv_04.pdf; CN.

Pillar et al.; Web-Site: http://papers.sae.org/952680/; All-wheel steering system for heavy truck applications. No. 952680. SAE Technical Paper, 1995. US.

\* cited by examiner

FOUR-WHEEL STEERING ADJUSTABLE TO SENSITIVITY OF OPERATOR CONTROLS

FIELD OF THE INVENTION

The invention relates generally to agricultural product application equipment such as self-propelled sprayers and, in particular, to a control system for providing four-wheel steering adjustable to sensitivity of operator controls.

BACKGROUND OF THE INVENTION

Agricultural machines, such as self-propelled agricultural sprayers, may provide conventional two-wheel steering or four-wheel steering options. In a conventional two-wheel steering configuration, a machine may be steered left or right via two or more wheels in the front, while two or more wheels in the rear of the machine are held in a substantially strait direction with respect to the machine. In a four-wheel steering configuration, the machine may be steered left or right via wheels in the front and rear both turning. For example, to turn left, wheels in the front may turn left while wheels in the rear turn right, and to turn right, wheels in the front may turn right while wheels in the rear turn left.

Four-wheel steering provides distinct advantages over conventional two-wheel steering. For example, four-wheel steering generally improves steering response and decreases turning radius. Consequently, it is preferable for agricultural machines to implement four-wheel steering to perform tight turns between crop rows. However, in longer straightaway paths, four-wheel steering is unnecessary and sometimes results in distracting wobbling and/or vibrations of the machine, thereby requiring an operator to continuously monitor and correct steering. As a result, operators oftentimes disable four-wheel steering in straightaway paths while enabling four-wheel steering during turns.

SUMMARY OF THE INVENTION

It is desirable to provide an agricultural machine with the advantages of four-wheel steering in turns and the advantage of two-wheel steering in straightaway paths without continuously requiring adjustment by the operator. Accordingly, a "dead-band" range is provided for automatically selecting between two-wheel and four-wheel steering. When an agricultural machine is being steered minimally within a first band (within the dead-band range), such as in a straightaway path, two-wheel steering is automatically selected. However, when the machine is being increasingly steered thereby reaching a second band (beyond the dead-band range), four-wheel steering is automatically selected. An operator may monitor the state of the machine steering via a touch-screen Human Machine Interface (HMI) in the cabin. The operator may adjust the dead-band range by increasing or decreasing sensitivity via the HMI, such as on a scale from 0 to 10.

To implement, a front sensor on a side wheel (e.g., left side) and a rear sensor on a same side wheel (e.g., also left side) monitors directional changes with respect to their local wheel. The sensors communicate with a control system interacting with the HMI. If a directional change is sensed in the front wheel within the dead-band, the rear wheel stays straight. However, if a directional change is sensed in the front wheel that exceeds the dead-band, the control system may execute a closed loop to eliminate the error and adjust steering of the rear wheel. As the wheels of one side are connected to the wheels of the other side, sensing wheels on only one side of the agricultural machine may be sufficient.

A closed loop control system has the additional advantage of ability to dampen steering correction so that adjustments are not sudden and harsh for the operator. In an embodiment, a bigger error may result in a more gradual correction/gain being applied, whereas a smaller error may result in a more aggressive correction/gain being applied.

According to one aspect of the invention, a steering control system for an agricultural machine having four wheels may be provided. The steering control system may include a first sensor in communication with a first wheel, the first sensor being configured to detect a turn angle of the first wheel; and a second sensor in communication with a second wheel, the second sensor being configured to detect a turn angle of the second wheel. The second wheel may be on an end of the agricultural machine opposite the first wheel in a direction of travel. The steering control system may also include a control system operable to, when a turn angle of the first wheel is determined to be greater than a threshold, adjust a turn angle of the second wheel to minimize an error between the turn angle of the first wheel detected by the first sensor and the turn angle of the second wheel detected by the second sensor. However, when a turn angle of the first wheel is determined to be less than the threshold, the control system may be operable to keep the second wheel in a substantially strait direction with respect to the agricultural machine.

According to another aspect of the invention, a method for steering an agricultural machine having four wheels may include: (a) sensing a turn angle of a first wheel using a first sensor; (b) sensing a turn angle of a second wheel using a second sensor, the second wheel being on an end of the agricultural machine opposite the first wheel in a direction of travel; (c) adjusting a turn angle of the second wheel to minimize an error between the turn angle of the first wheel detected by the first sensor and the turn angle of the second wheel detected by the second sensor when a turn angle of the first wheel is determined to be greater than a threshold; and (d) keeping the second wheel in a substantially strait direction with respect to the agricultural machine when a turn angle of the first wheel is determined to be less than the threshold.

According to another aspect of the invention, an agricultural sprayer may include a sprayer boom extending transversely relative to the agricultural sprayer, two wheels near a front end of the agricultural sprayer, and two wheels near a rear end of the agricultural sprayer. A first sensor may be in communication with a first wheel, the first wheel being one of the two wheels near the front end. The first sensor may be configured to detect a turn angle of the first wheel. A second sensor may be in communication with a second wheel, the second wheel being one of the two wheels near the rear end and being on a same side of the agricultural sprayer as the first wheel. The second sensor may be configured to detect a turn angle of the second wheel. A control system may be operable to, when a turn angle of the first wheel is determined to be greater than a threshold, adjust a turn angle of the second wheel to minimize an error between the turn angle of the first wheel detected by the first sensor and the turn angle of the second wheel detected by the second sensor. The control system may be operable to, when a turn angle of the first wheel is determined to be less than the threshold, keep the second wheel in a substantially strait direction with respect to the agricultural sprayer.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
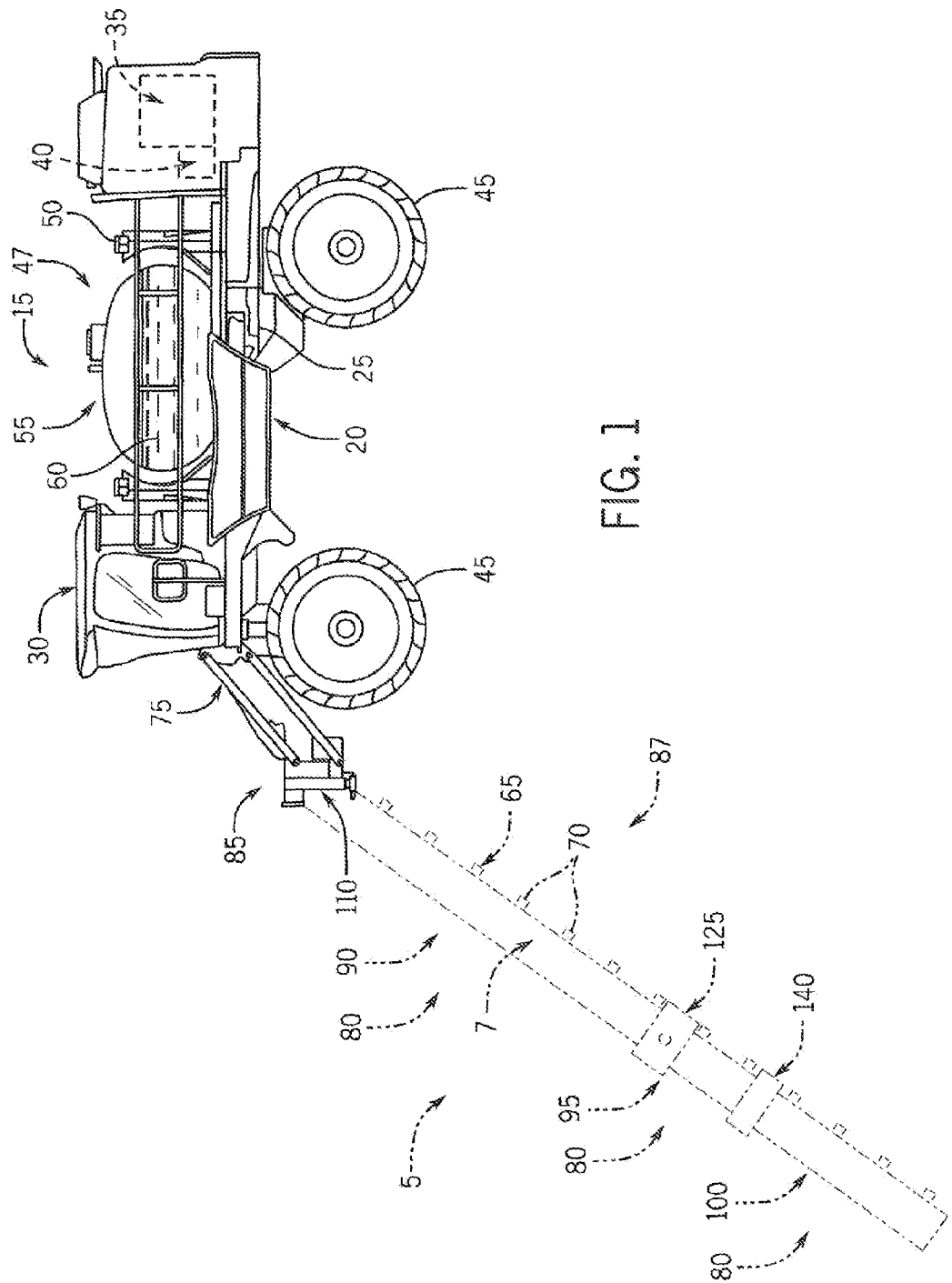
FIG. 1 is a side elevation of an exemplar agricultural machine with a control system for providing four wheel-steering adjustable to sensitivity of operator controls according to the present invention.

Referring now to the drawings and specifically to FIG. 1, a control system for providing four-wheel steering adjustable to sensitivity of operator controls, explained in greater detail elsewhere herein, is shown for use with an agricultural machine which may be an agricultural sprayer. The agricultural sprayer is shown here as a self-propelled agricultural sprayer vehicle or self-propelled sprayer 15. Although sprayer 15 is shown as a front-mounted boom self-propelled sprayer, it is understood that self-propelled versions of sprayer 15 can have either front-mounted or rear-mounted booms, such as those available from CNH Industrial, including the Miller Nitro and Condor Series sprayers and New Holland Guardian Series sprayers.

Still referring to FIG. 1, sprayer 15 includes chassis 20 having chassis frame 25 that supports various assemblies, systems, and components. These various assemblies, systems, and components include a cab 30, an engine 35 and hydraulic system 40. The hydraulic system 40 receives power from the engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating the wheels 45. In mechanical drive applications, a mechanical transmission receives power from the engine 35 and delivers power for rotating the wheels 45 by way of power-transmitting driveline components such as drive shafts, differentials, and other gear sets in portal, drop boxes, or other housings. A spray system 47 includes storage containers such as rinse tank 50 storing water or a rinsing solution and a product tank 55 that stores a volume of product 60 for delivery onto an agricultural field with sprayer 15. A product delivery pump conveys product 60 from product tank 55 through plumbing components such as interconnected pieces of tubing and through a boom tubing system 65 for release out of spray nozzles 70 that are spaced from each another along the width of boom 7 during spraying operations of sprayer 15. Groups or banks of multiple adjacent spray nozzles 70 define multiple spray sections 72 of spray system 47. Spray sections 72 are defined along boom 7 and selectively deliver product 60 for release onto an agricultural field at locations corresponding to positions of activated spray sections 72. Boom 7 is connected to chassis 20 with lift arm assembly 75 that is configured to move the boom 7 up and down for adjusting the height of application of the product 60.

Figure 2:
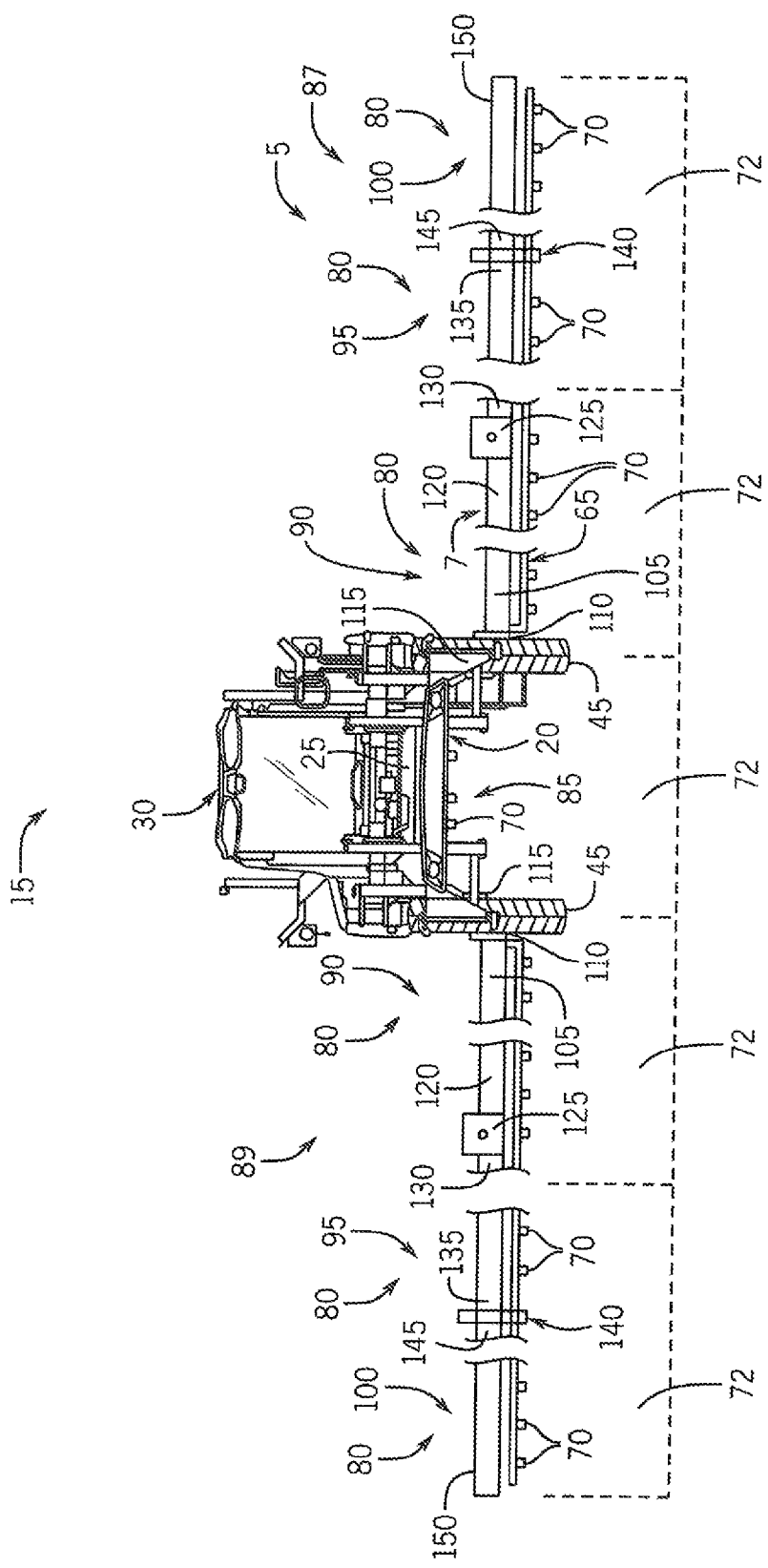
FIG. 2 is a front elevation of the agricultural machine of FIG. 1.

Referring now to FIG. 2, boom 7 includes multiple boom segments 80 connected longitudinally to provide the corresponding width of the assembled boom 7. Boom segments 80 include center section 85 and left and right boom arms 87, 89 extending in opposite directions from center section 85. Left and right boom arms 87, 89 have multiple segments with pairs of primary boom segments 90, secondary boom segments 95, and breakaway boom segments 100 extending in opposite directions along the respective left and right boom arms 87, 89, mirrored about a longitudinal axis of the sprayer 15. The corresponding left and right segments of the pairs of primary, secondary, and breakaway boom segments 90, 95, 100 are substantially identical, so only one will be described, with the description applying to both the left and right segments of left and right boom arms 87, 89. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 7 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward to primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored position of boom 7, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15

Figure 3:
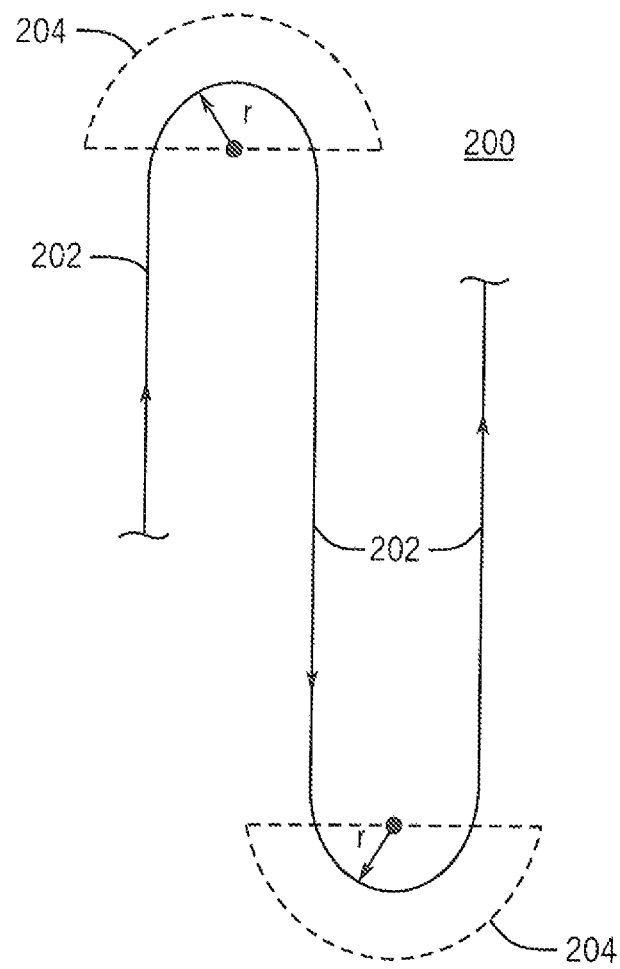
FIG. 3 is an exemplar plan view of an agricultural route for the machine of FIGS. 1 and 2.

Referring now to FIG. 3, an exemplar plan view of an agricultural route for the sprayer 15 of FIGS. 1 and 2 is provided. In an agricultural field 200, the sprayer 15 may typically follow a serpentine route which includes a plurality of straightaway paths 202 (which may follow crop rows) followed by U-turns 204. The straightaway paths 202 may cover reasonably long distances such that two-wheel steering would be more desirable to minimize wobbling and/or vibrations of the sprayer 15. On the other hand, the U-turns 204 may require a reasonably tight turning radius "r," such that four-wheel steering would be more desirable to improve steering response and decrease turning radius of the sprayer 15. According to the present invention, the sprayer 15 may be controlled to automatically switch between two-wheel steering in the straightaway paths 202 and four-wheel steering for the U-turns 204. With four-wheel steering enabled, the sprayer 15 could turn with a radius of approximately 15 feet, for example, whereas with two-wheel steering enabled, the sprayer 15 might turn with a radius of approximately 21 feet.

Figure 4:
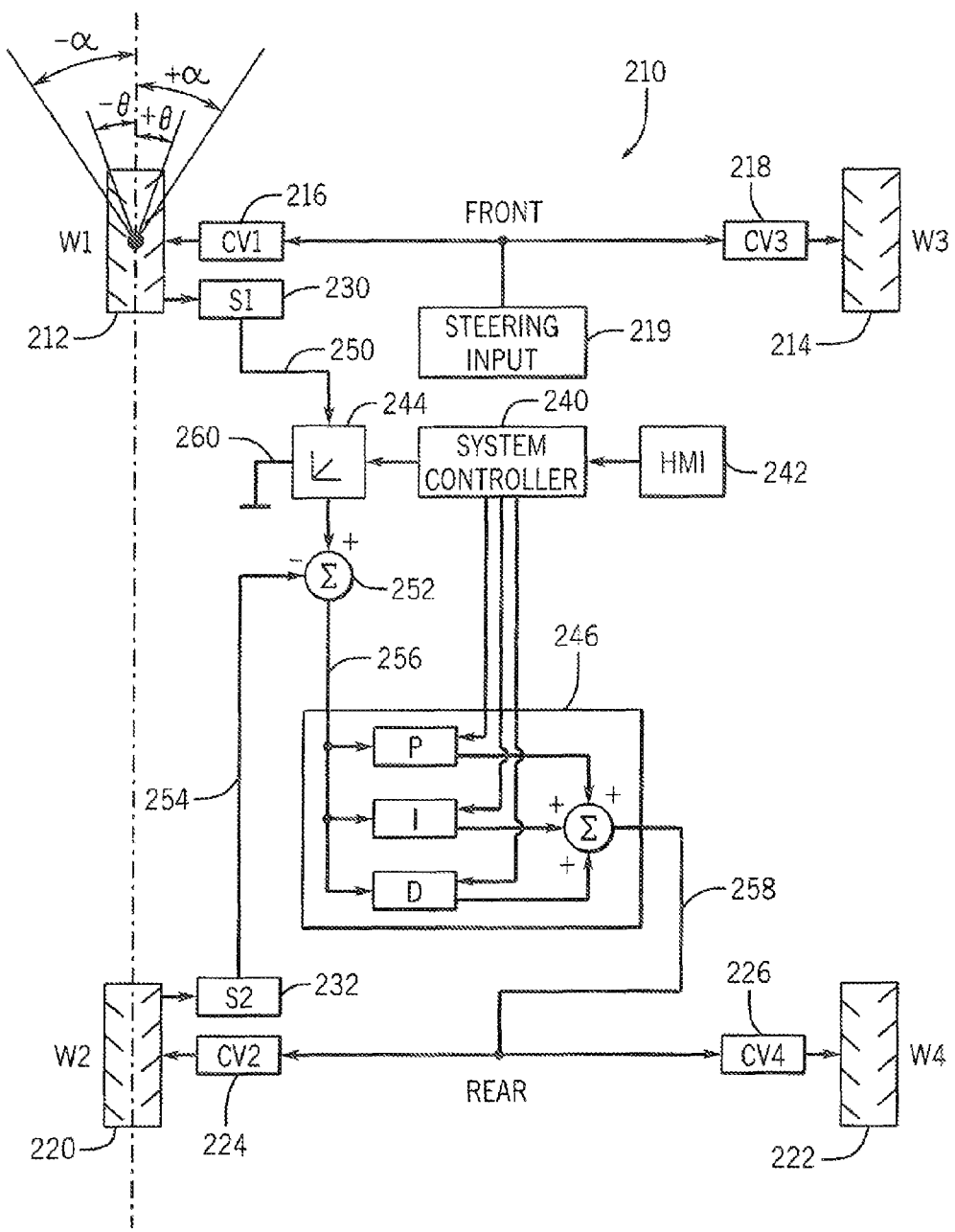
FIG. 4 is simplified schematic view of the control system of FIGS. 1 and 2.

Referring now to FIG. 4, a simplified schematic view of a control system 210 for providing four wheel-steering adjustable to sensitivity of operator controls for the sprayer 15 is provided. The wheels 45 may include at least two wheels near a front end of the sprayer 15 and at least two wheels near a rear end of the sprayer 15. A first wheel 212 (labeled "W1") of the two wheels near the front end may be in communication with another wheel 214 (labeled "W3") of the two wheels near the front end, such as via left and right front power-transmitting driveline components 216 and 218 (labeled "CV1" and "CV3"), respectively, which may be hydraulically actuated control valves for steering the front wheels. A steering input 219, which could be a steering wheel or other steering control in the cabin, may be in communication with the left and right front power-transmitting driveline components 216 and 218, respectively, for allowing the operator to steer the sprayer 15.

Similarly, a second wheel 220 (labeled "W2") of the two wheels near the rear end may be in communication with another wheel 222 (labeled "W4") of the two wheels near the rear end, such as via left and right rear power-transmitting driveline components 224 and 226 (labeled "CV2" and "CV4"), respectively, which may also be hydraulically actuated control valves for steering each of the rear wheels. Accordingly, the second wheel 220 is positioned on an end of the sprayer 15 that is opposite the first wheel 212 in a direction of travel.

A first sensor 230 (labeled "S1") is in communication with the first wheel 212. The first sensor 230 is configured to detect a turn angle of the first wheel 212. Similarly, a second sensor 232 (labeled "S2") is in communication with the second wheel 220. The second sensor 232 is configured to detect a turn angle of the second wheel 220. The first and second sensors 230 and 232, respectively, may be position sensors which permit absolute and/or relative position measurement linearly, angularly and/or with respect to multiple axes. The first and second sensors 230 and 232 could be, for example, Hall Effect sensors and could also incorporate gyroscopes. One example of a sensor is described further below with respect to FIG. 8.

Still referring to FIG. 3, the control system 210 may include a system controller 240 in communication with a touchscreen HMI 242, a turn angle sensitivity filter 244 and a closed loop controller 246. The system controller 240 may receive input from an operator via the HMI 242, such as to configure the turn angle sensitivity filter 244 and/or the closed loop controller 246. For example, the system controller 240 may receive an input from an operator to configure a dead-band steering range via the turn angle sensitivity filter 244 and/or steering responsiveness via the closed loop controller 246. Various aspects of the system controller 240, the HMI 242, the turn angle sensitivity filter 244 and the closed loop controller 246 may be integrated into one or more components, and/or with varying levels of software integration, within the scope of the invention.

In an aspect of the invention, the turn angle sensitivity filter 244 may receive an electrical signal representing a turn angle 250 of the first wheel 212 as detected by the first sensor 230. If the turn angle 250 of the first wheel 212 is determined by the turn angle sensitivity filter 244 to be greater than a threshold, the turn angle 250 of the first wheel 212 may be provided by the turn angle sensitivity filter 244 to a positive input of a summation block 252 as part of a control loop (thereby providing a set point). The threshold may be configured by the system controller 240, which may, in turn, be set according to an input received by an operator via the HMI 242. Accordingly, the system controller 240 may be operable to adjust the threshold upon command by an operator.

An electrical signal representing a turn angle 254 of the second wheel 220 detected by the second sensor 232 may be provided to a negative input of the summation block 252 (thereby providing a process variable). Accordingly, the summation block 252 may produce an error signal 256 representing an error between the turn angle 250 of the first wheel 212 detected by the first sensor 230 and the turn angle 254 of the second wheel 220 detected by the second sensor 232. The closed loop controller 246 may receive the error signal 256 to produce an output signal 258 to adjust the turn angle of the second wheel 220 to minimize the error (in a closed feedback loop) between the turn angle 250 of the first wheel 212 detected by the first sensor 230 and the turn angle 254 of the second wheel 220 detected by the second sensor 232.

However, if the turn angle 250 of the first wheel 212 is determined by the turn angle sensitivity filter 244 to be less than a threshold, a null signal 260 representing a turn angle of 0° could instead be provided by the turn angle sensitivity filter 244 to the positive input of the summation block 252 in the control loop. Accordingly, the summation block 252 may produce an error signal 256 representing an error between the null signal 260 representing a turn angle of 0° and the turn angle 254 of the second wheel 220 detected by the second sensor 232. The closed loop controller 246 may then receive the error signal 256 to produce an output signal 258 to adjust the turn angle of the second wheel 220 to minimize the error (in a closed feedback loop) between the null signal 260 representing a turn angle of 0° and the turn angle 254 of the second wheel 220 detected by the second sensor 232. As a result, the control system 210 will keep the second wheel 220 in a substantially strait direction with respect to the sprayer 15. Alternatively, the system controller 240 and the turn angle sensitivity filter 244 could disable the closed loop controller 246 and the closed feedback loop and allow mechanical mechanism or other means to enable for keeping the second wheel 220 in a substantially strait direction with respect to the sprayer 15.

In some aspects, the closed loop controller 246 could be, for example, a Proportional-Integral (PI) controller providing proportional and integral feedback to minimize the error signal 256. Alternatively, the closed loop controller 246 could be a Proportional-Integral-Derivative (PID) controller providing proportional, integral and derivative feedback to minimize the error signal 256. As is generally understood, proportional, integral and derivative feedback may involve three separate constant parameters which may be denoted "P," "I" and "D." P may depend on a present error, I may depend on an accumulation of past errors, and D may be a prediction of future errors. The weighted sum of one or more of these three determinations may be used to provide the output signal 258 to adjust the turn angle of the second wheel 220. The system controller 240 may configure one or more parameters of the proportional, integral and derivative feedback, such as via the HMI 242, such as to control steering responsiveness.

Accordingly, a "dead-band" range is provided for automatically selecting between two-wheel steering and four-wheel steering. When the sprayer 15 is being steered minimally within a first band less than the threshold (within the dead-band range), such as in straightaway paths 202, two-wheel steering may be automatically selected. The dead-band range may correspond to a turn angle 250 of the first wheel 212 being less than ±θ. However, when the sprayer 15 is being increasingly steered reaching a second band greater than the threshold (beyond the dead-band range), four-wheel steering may be automatically selected. The second band may correspond to a turn angle 250 of the first wheel 212 being greater than ±θ (and within a maximum overall steering range of ±α). The sprayer 15 may transition back and forth between the first and second bands, and therefore back and forth between two-wheel steering and four-wheel steering, numerous times.

Also, in alternative aspects, the first sensor 230 could be configured with respect to any of the front wheels (left, right or otherwise) simultaneous with the second sensor 232 being configured with respect to any of the rear wheels (left, right or otherwise). In addition, if desired, the steering input 219 could be provided with respect to the rear wheels while the closed loop controller 246 could operate with respect to the front wheels. Such modifications are deemed within the scope of the present invention.

Figure 5:
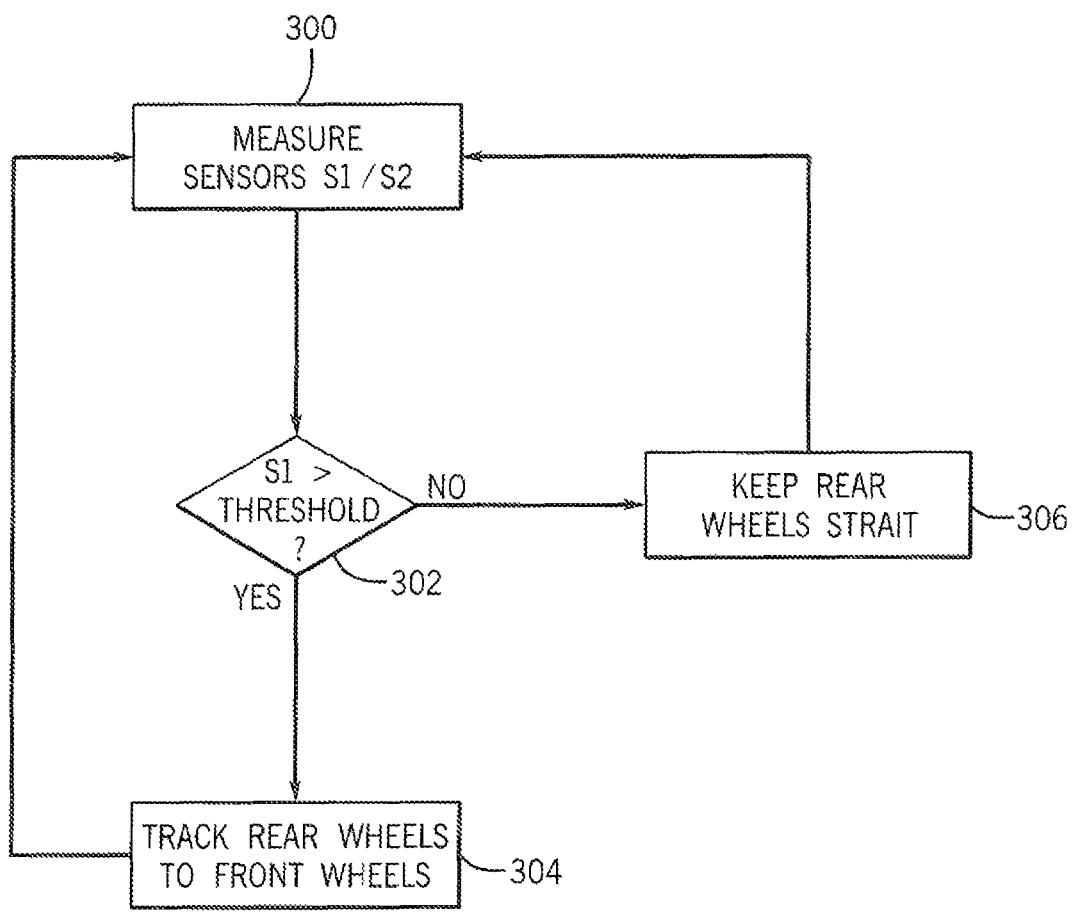
FIG. 5 is a simplified flow chart for operation of the control system of FIG. 4.

Referring now to FIG. 5, a simplified flow chart illustrating operation of the control system of FIG. 4 in accordance with an aspect of the invention is provided. In step 300, the first and second sensors 230 and 232, respectively, are sensed to measure turn angles of the first and second wheels 212 and 220, respectively. Next, in decision block 302, the control system 210 determines whether a turn angle of the first wheel 212, as provided by the first sensor 230, is greater than a threshold. If the turn angle of the first wheel 212 is greater than the threshold, then in step 304, the control system 210 configures the rear wheels, 220 and 222, to track the front wheels, 212 and 214, to enable four-wheel steering. However, if the turn angle of the first wheel 212 is not greater than the threshold, then in step 306, the control system 210 configures the rear wheels, 220 and 222, to keep in a substantially strait direction with respect to the sprayer 15 to enable two-wheel steering. In either result (step 304 or step 306), the control system 210 repeats the process again by returning to step 300.

Figure 6:
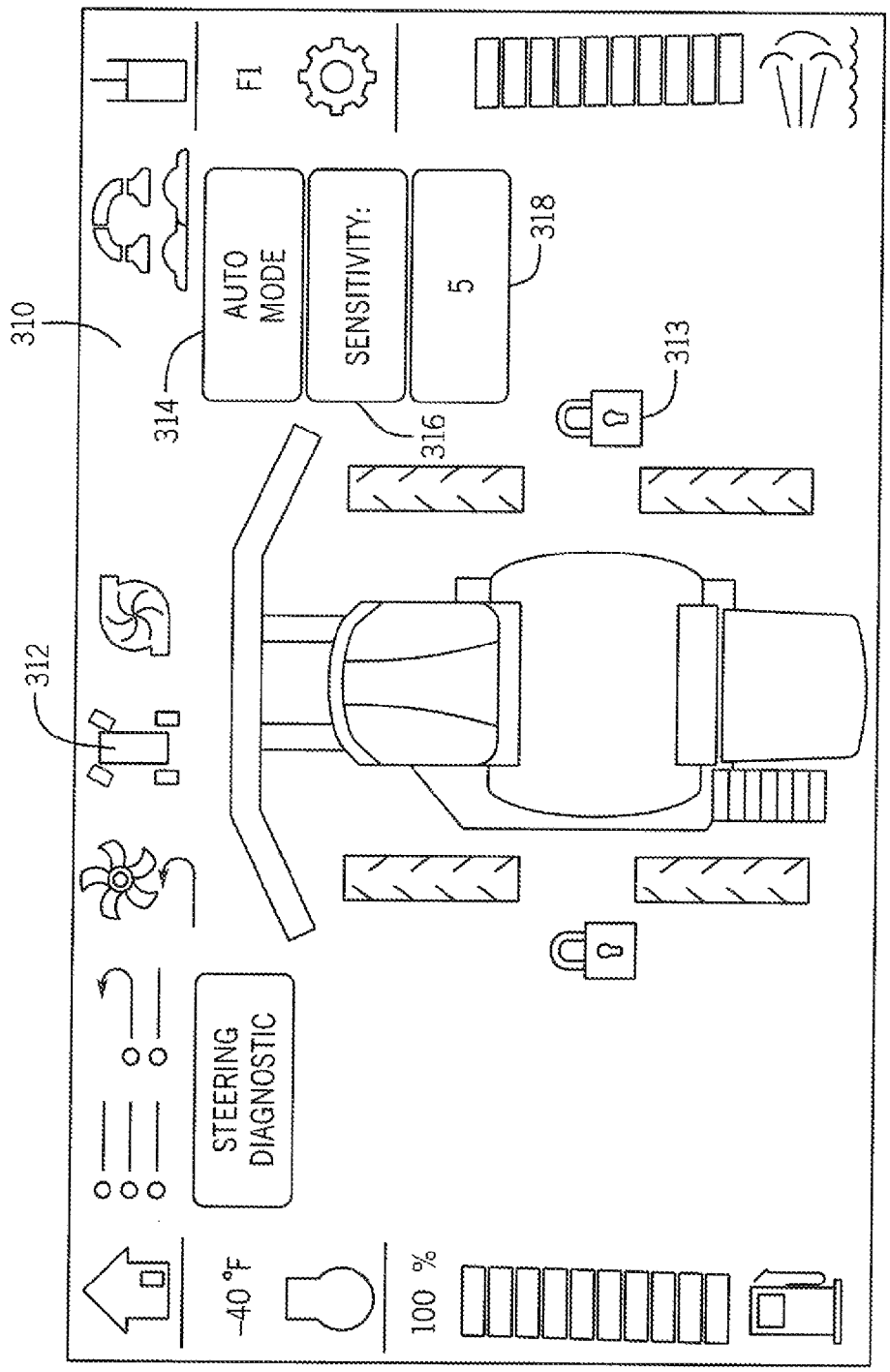
FIG. 6 is an exemplar graphical view for a touchscreen Human Machine Interface (HMI) for providing operator controls with respect to the control system of FIG. 4.

Referring now to FIG. 6, an exemplar graphical view 310 for a screen of the HMI 242 for providing operator controls with respect to the control system of FIG. 4 is provided. A first icon 312 may be provided to quickly show an operator whether the sprayer 15 is operating in a two-wheel steering mode or a four-wheel steering mode. For example, when four-wheel steering is selected by the sprayer 15, such as upon entering a tight radius turn, the first icon 312 may brightly illuminate or change color. Conversely, when two-wheel steering is selected by the sprayer 15, such as upon completing a turn and entering a straightaway path again, the first icon 312 may dim or return to its original color. A lock icon 313, which may be activated by an operator's touch, may indicate whether the steering mode of the sprayer 15 is locked, thereby preventing steering mode change, or unlocked.

A second icon 314 may be provided to quickly show an operator whether the sprayer 15 is configured to automatically transition between the two-wheel steering mode and the four-wheel steering mode. For example, when configured to automatically transition between modes, the second icon 314 may indicate "Auto Mode." Accordingly, the steering of the rear wheels may then be set to follow the sensitivity zone set up for the front wheels. This means the rear wheels will not steer unless the front wheels are turned out of the sensitivity zone. Once the front wheels are turned beyond this point the rear wheels will turn to follow the front wheels. Conversely, when not configured to automatically transition between modes, the icon second 314 may indicate "Manual Mode."

Figure 7:
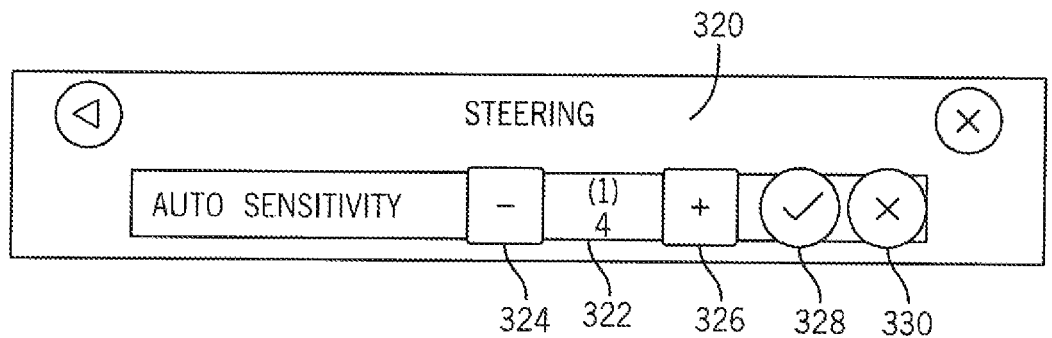
FIG. 7 is an exemplar sensitivity control which may be provided by the HMI of FIG. 6.

A third icon 316 may indicate "Sensitivity" with respect to the steering mode of the machine, and a fourth icon 318 may indicate a particular sensitivity setting, such as on a scale from 0 to 10. Touching either the third or fourth icons 316 or 318, respectively, for example, may enable a sensitivity control interface 320 to be graphically displayed via the HMI 242 as shown in FIG. 7. The sensitivity control interface 320 may allow the sensitivity of the rear wheels reacting to the movement of the front wheels to be controlled. For example, a numerical value 322 reflecting a steering sensitivity may be displayed, such as on a scale from 0 to 10. Touching a "−" icon 324 may allow decreasing the sensitivity, whereas touching a "+" icon 326 may allow increasing the sensitivity. Setting the numerical value 322 higher will widen the dead-band zone that the front wheels can be steered in without the rear wheels steering (wider ±θ). Conversely, setting the numerical value 322 lower will narrow the dead-band zone that the front wheels can be steered in without the rear wheels steering (narrower ±θ). The numerical value 322 may be set to a personal preference of the operator. An accept icon 328 may then be touched to confirm the selected numerical value 322, or a cancel icon 330 may be touched to reject the selected numerical value 322.

Figure 8:
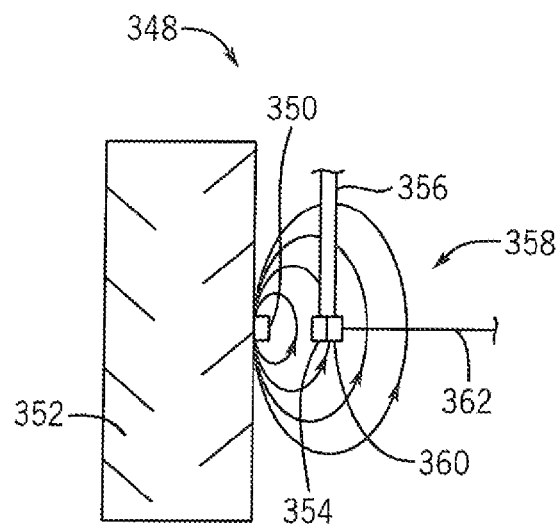
FIG. 8 is an exemplar sensor for detecting a turn angle of a wheel according to the present invention.

Referring now to FIG. 8, an exemplar sensor for detecting a turn angle of a wheel according to the present invention is provided. Similar to a Hall Effect sensor, a sensor system 348 may include a first magnetic element 350 positioned with respect to a wheel 352, and a second magnetic element 354 positioned with respect to a supporting structure 356 proximal to the wheel 352. The first magnetic element 350 produces a magnetic field 358, and as the wheel 352 turns, the strength of the magnetic field 358 as detected by the second magnetic element 354 will vary. Accordingly, the second magnetic element 354, coupled to an electromagnetic circuit 360, may operate as a transducer to provide an electrical signal 362 with a varying output voltage corresponding to a strength of the magnetic field 358 and thus the turn angle of the wheel 352.

Many changes and modifications could be made to the invention without departing from the spirit thereof. The scope of these changes will become apparent from the appended claims.

I claim:

1. A steering control system for an agricultural machine having four wheels, the steering control system comprising:
   a first sensor in communication with a first wheel, the first sensor being configured to detect a turn angle of the first wheel;
   a second sensor in communication with a second wheel, the second sensor being configured to detect a turn angle of the second wheel, the second wheel being on an end of the agricultural machine opposite the first wheel in a direction of travel; and
   a control system operable to:
   (a) when a turn angle of the first wheel is determined to be greater than a threshold, adjust a turn angle of the second wheel to minimize an error between the turn angle of the first wheel detected by the first sensor and the turn angle of the second wheel detected by the second sensor; and
   (b) when a turn angle of the first wheel is determined to be less than the threshold, keep the second wheel in a substantially strait direction with respect to the agricultural machine.

2. The steering control system of claim 1, further comprising, when the turn angle of the first wheel is determined to be less than the threshold, the control system being operable to minimize an error between 0° and the turn angle of the second wheel detected by the second sensor to keep the second wheel in the substantially strait direction with respect to the agricultural machine.

3. The steering control system of claim 1, further comprising a turn angle sensitivity filter in communication with the control system operable to adjust the threshold.

4. The steering control system of claim 3, further comprising a Human Machine Interface (HMI) for receiving an input operable to configure the turn angle sensitivity filter.

5. The steering control system of claim 1, wherein the control system includes a closed loop controller configured to provide proportional and integral feedback to minimize the error.

6. The steering control system of claim 5, wherein the closed loop controller further provides derivative feedback to minimize the error.

7. The steering control system of claim 5, further comprising a Human Machine Interface (HMI) for receiving an input operable to configure a gain of the closed loop controller.

8. The steering control system of claim 1, wherein at least one of the first sensor and the second sensor includes a transducer operable to vary an output voltage in response to a magnetic field.

9. The steering control system of claim 1, wherein the first wheel is on a front end of the agricultural machine and the second wheel is on a rear end of the agricultural machine.

10. The steering control system of claim 9, wherein the first and second wheels are on a same side of the agricultural machine.

11. A method for steering an agricultural machine having four wheels, the method comprising:
    (a) sensing a turn angle of a first wheel using a first sensor;
    (b) sensing a turn angle of a second wheel using a second sensor, the second wheel being on an end of the agricultural machine opposite the first wheel in a direction of travel;
    (c) adjusting a turn angle of the second wheel to minimize an error between the turn angle of the first wheel detected by the first sensor and the turn angle of the second wheel detected by the second sensor when a turn angle of the first wheel is determined to be greater than a threshold; and
    (d) keeping the second wheel in a substantially strait direction with respect to the agricultural machine when a turn angle of the first wheel is determined to be less than the threshold.

12. The method of claim 11, further comprising adjusting a turn angle of the second wheel to minimize an error between 0° and the turn angle of the second wheel detected by the second sensor when a turn angle of the first wheel is determined to be less than the threshold.

13. The method of claim 11, further comprising receiving an input operable to adjust the threshold.

14. The method of claim 11, further comprising receiving an input operable to adjust a gain of a closed loop controller for minimizing the error.

15. An agricultural sprayer comprising:
    a sprayer boom extending transversely relative to the agricultural sprayer;
    two wheels near a front end of the agricultural sprayer;
    two wheels near a rear end of the agricultural sprayer;
    a first sensor in communication with a first wheel, the first wheel being one of the two wheels near the front end, the first sensor being configured to detect a turn angle of the first wheel;
    a second sensor in communication with a second wheel, the second wheel being one of the two wheels near the rear end and being on a same side of the agricultural sprayer as the first wheel, the second sensor being configured to detect a turn angle of the second wheel; and
    a control system operable to:
    (a) when a turn angle of the first wheel is determined to be greater than a threshold, adjust a turn angle of the second wheel to minimize an error between the turn angle of the first wheel detected by the first sensor and the turn angle of the second wheel detected by the second sensor; and
    (b) when a turn angle of the first wheel is determined to be less than the threshold, keep the second wheel in a substantially strait direction with respect to the agricultural sprayer.

16. The agricultural sprayer of claim 15, further comprising, when the turn angle of the first wheel is determined to be less than the threshold, the control system being operable to minimize an error between 0° and the turn angle of the second wheel detected by the second sensor to keep the second wheel in the substantially strait direction with respect to the agricultural machine.

17. The agricultural sprayer of claim 15, further comprising a turn angle sensitivity filter in communication with the control system operable to adjust the threshold.

18. The agricultural sprayer of claim 17, further comprising a Human Machine Interface (HMI) for receiving an input operable to configure the turn angle sensitivity filter.

19. The agricultural sprayer of claim 15, wherein the control system includes a closed loop controller configured to provide proportional and integral feedback to minimize the error.

20. The agricultural sprayer of claim 15, wherein the first and second sensors include transducers operable to vary an output voltage in response to a magnetic field.

* * * * *